R. BRAUN.
SYSTEM OF ELECTRICAL DISTRIBUTION.
APPLICATION FILED MAY 21, 1906. RENEWED JUNE 15, 1911.
1,013,270. Patented Jan. 2, 1912.
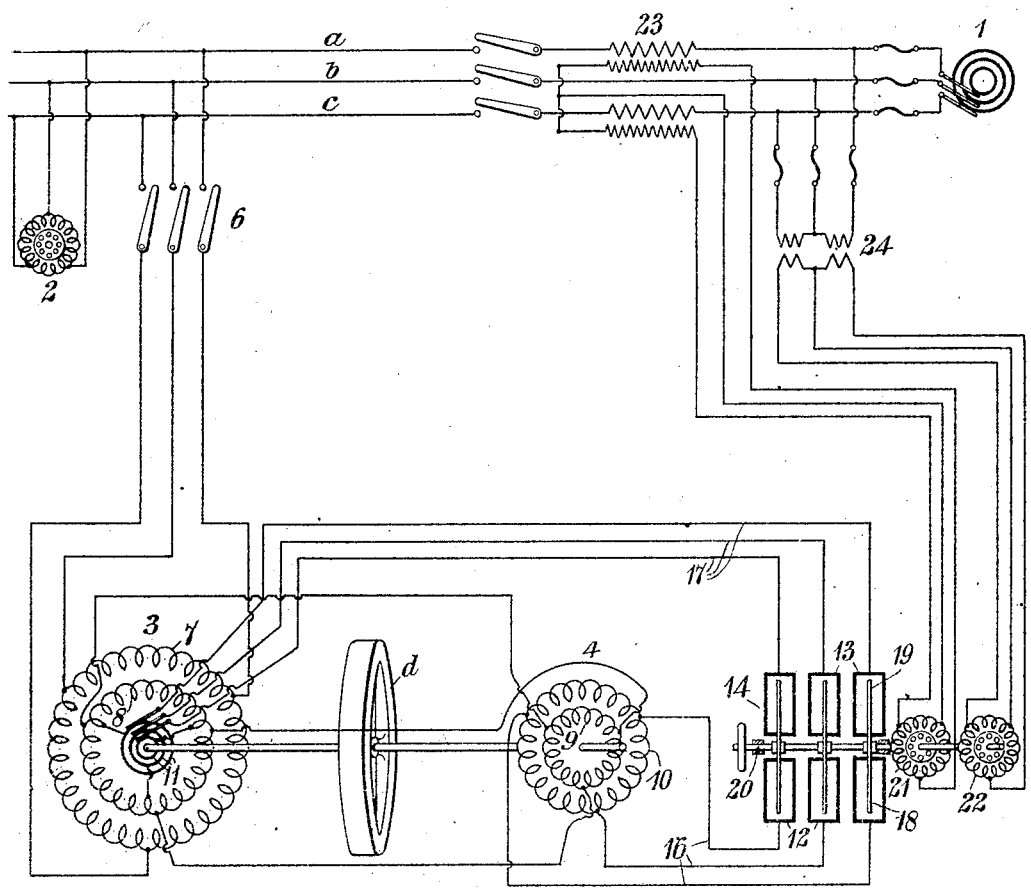
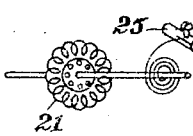
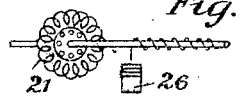
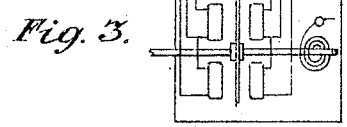
WITNESSES:
C. L. Belcher
Otto S. Schairer
INVENTOR
Rudolf Braun
BY
Oakley G. Carr
ATTORNEY

UNITED STATES PATENT OFFICE.

RUDOLF BRAUN, OF MANCHESTER, ENGLAND, ASSIGNOR TO WESTINGHOUSE ELECTRIC & MANUFACTURING COMPANY, A CORPORATION OF PENNSYLVANIA.

SYSTEM OF ELECTRICAL DISTRIBUTION.

1,013,270.          Specification of Letters Patent.        Patented Jan. 2, 1912.

Application filed May 21, 1906, Serial No. 318,006. Renewed June 15, 1911. Serial No. 633,349.

*To all whom it may concern:*

Be it known that I, RUDOLF BRAUN, a subject of the German Emperor, and a resident of Manchester, in the county of Lancaster, England, have invented a new and useful Improvement in Systems of Electrical Distribution, of which the following is a specification.

My invention relates to alternating current circuits and particularly to such circuits as are required to supply a load variable both in magnitude and power factor, such as motors for operating rolling mills, shears hoists and the like.

The invention has for its object to provide means for equalizing such variable loads so as to enable generators of smaller capacity to be used and to maintain the load on these approximately constant. For this purpose, an equalizing device is connected to the supply circuit at a point in the circuit at which the apparatus constituting the variable load is connected. This equalizer consists of an induction motor having a phase winding connected to slip rings on its secondary member, the primary winding being connected to the supply circuit.

The induction motor acts as a generator or as a motor, according to the nature of the load on the circuit, in the following manner:—It is well known that if an asynchronous motor that is connected to a supply circuit be driven at a speed above synchronous speed, the motor will act as a generator and supply current to the line. This synchronous speed above which the motor must be driven will, in the case of a single induction motor having a short-circuited secondary, evidently depend upon the number of poles and the frequency of the circuit. If, however, two asynchronous motors are connected together in a well-known cascade arrangement, the synchronous speed of the combined rotor will be less than that corresponding to one motor alone. This principle is made use of in the present invention in which the induction motor constituting the equalizer is mechanically coupled to the rotor of another asynchronous motor (hereinafter referred to as the exciter), and also to a fly-wheel, the windings of the two rotors being electrically connected together. By means of slip rings, the secondary winding of the equalizer can be short-circuited through a rheostat, the secondary (stator winding) of the exciter being open circuited. The equalizer will then operate in the ordinary manner as an induction motor and will take power from the line to accelerate the rotor and fly-wheel until they are running slightly below synchronous speed. If the resistance that short-circuits the equalizer secondary be reduced, the speed will increase and more nearly approach to synchronous speed. If now, while the motor is running at this speed, the secondary of the exciter be short-circuited through a resistance and the slip rings of the equalizer be disconnected from their short-circuiting resistance, the combined rotor will evidently be running at a higher speed than the synchronous speed of the motors connected in cascade, and the equalizer will consequently supply power to the line, which power will be drawn from the kinetic energy of the fly-wheel and rotor, the speed of which will therefore decrease until it is below the true synchronous speed of the combination. The rate of supply of power to the line will depend upon the amount of resistance short-circuiting the secondary of the exciter. This insertion and adjustment of resistance in the equalizer secondary and the exciter secondary is performed by a regulator (preferably of the water-rheostat type) hereinafter to be described.

The invention is illustrated in the accompanying drawings of which—

Figure 1 is a diagram showing an equalizer connected to a three-phase supply circuit. Fig. 2 is a diagrammatic side view of a convenient form of regulator to be used in connection therewith and Figs. 3, 4 and 5 illustrate modifications of the actuating means for the regulator.

Referring now to Fig. 1, the load equalizer 3 has its primary winding connected, through a switch 6, to the supply circuit $a$—$b$—$c$ at a point intermediate the power station 1 and the load 2, the secondary winding 8 of the equalizer being provided with slip rings 11. The rotor of the equalizer is coupled to a fly-wheel $d$ and to the rotor of a small induction motor 4, preferably of the two-pole type, which acts as an asynchronous exciter. The primary winding 9 of the exciter 4 is connected to the secondary winding 8 of the equalizer, while the secondary winding 10 of the exciter is connected to a resistance regulator 14. The resistance regulator 14 is also connected to the slip rings 11 of the equalizer 8.

As illustrated in the drawings, the regulator 14 consists of two sections each composed of three insulated tanks 12 and 13 filled with water or other suitable conducting liquid, the conductors 16 from the exciter stator 10 being connected to one set of tanks 12, and the conductors 17 from the slip rings 11 being connected to the other set of tanks 13.

Three vanes 18 and three vanes 19 are mounted upon a shaft 20 that is located above and between the tanks 12 and 13 so that, by rocking the shaft in the one direction or the other, the one or the other set of vanes may be caused to dip into the liquid in the coresponding tanks and thus short-circuit the one or the other of the sets of conductors 16, 17, through a greater or less resistance. The relative positions of the vanes for each section is such that the vanes of one section are dipped into the liquid while those of the other section are outside. In the middle position of the shaft the ends of the vanes of both sections are in contact with the surface of the water in their corresponding tanks so that before one circuit is opened the other is already closed, thus reducing the amount of sparking. The movable member of this rheostat is mechanically balanced and supported by bearings, and its shaft is arranged to be rotated through a certain angle in the one direction or the other by the control motors. These control motors may take the form of small induction motors 21, 22. The primary winding of the first motor 21 is connected in series with the secondary windings of a set of series transformers 23 with which the main circuit is provided, while the primary winding of the other control motor 22 is connected in series with the secondary windings of transformers 24 that are connected across the supply circuit. The connection of the control motor 21 is thus similar to that of an ammeter, while the connection of the control motor 22 corresponds to that of a voltmeter, and if instrument transformers are being used at a convenient point in the line to supply ammeters and voltmeters, the same transformers may be utilized to supply current to the control motors.

The primary connections of the control motors 21, 22, are so arranged as to produce in the secondaries of the motors torques opposite to one another, so that, with a certain current and voltage on the line the two torques will be equal and balanced. When this is the case, the shaft of the rheostat 14 will not move and it will only be turned in the one or the other direction in case the torque of one of the control motors becomes higher than that of the other.

The current control motor 21 tends to dip the corresponding set of vanes of the rheostat 14 into the tanks 12 while the voltage control motor 22 tends to dip the other set of vanes into the tanks 13. An increase of current in the main circuit $a$—$b$—$c$ will thus serve to diminish the resistance connected to the winding 10 of the exciter, while an increase in the voltage of the circuit, or a decrease of current in the main circuit, will diminish the resistance connected to the slip rings 11 of the equalizer. A decrease in the resistance connected to the slip rings 11 will cause the equalizer 3 to act as a motor and to take power from the line to which it is connected. A decrease in the resistance connected to the winding 10 of the exciter will, on the other hand, cause the equalizer 3 to act as a generator and to give power to the line. In the first case, the speed of the fly-wheel will be increased, and in the second it will be decreased.

The control motors 21, 22, will thus regulate the action of the equalizer relative to a predetermined fixed apparent power output of the station. If it be desired to regulate according to a fixed real power output of a station, it is only necessary to produce a wattmeter torque on the shaft of the rheostat, which can be done by coils arranged as in any form of wattmeter, for instance, as illustrated in Fig. 3. It may be desirable, also, in some cases to omit the voltage control motor and to substitute therefor an adjustable spring, as illustrated in Fig. 4, the adjustment of the spring being conveniently effected by clamping it at the desired point in the post 25. An adjustable weight 26 (Fig. 5) may also be employed instead of the motor 22. If it be desired to regulate the average output of the station, the torque exerted by the spring 25 or the weight 26 (Figs. 4 and 5) in opposition to that exerted by the motor 21 upon the rheostat shaft may be adjusted. Of course, other actuating devices for the rheostat shaft may be employed, those herein specifically set forth being only illustrative of suitable means for the purpose, and the rheostat 14, the load equalizer 3, and the asynchronous exciter 4 may evidently be of any other suitable types than those illustrated without departing from the spirit of the invention.

As will be seen from the foregoing description, my improved apparatus consists essentially of two asynchronous machines connected in cascade and having their rotors mechanically coupled to a fly-wheel, the synchronous speed of the combination depending on which of the two secondary members is short-circuited.

The asynchronous machines may be of any suitable type with their windings arranged in a well-known manner, and the particular arrangements herein described are intended only by way of illustration and not of limitation.

I claim as my invention:

1. An apparatus for equalizing the load on an alternating current supply circuit comprising two asynchronous machines the rotors of which are mechanically coupled together and provided with a fly-wheel, the secondary winding of the first machine being electrically connected to the primary winding of the second machine, automatic means being provided whereby the one or the other of the secondary windings is short-circuited or closed on itself, through a resistance, to vary the speed of the apparatus according to the amount or character of the load on the supply circuit.

2. In an equalizer of the kind described, the combination with two asynchronous machines, of a resistance connected to the secondary winding of either of said machines and comprising a plurality of vanes, a rock-shaft on which said vanes are mounted, and two sets of insulated tanks containing water or other suitable liquid to receive said vanes, one of the said sets of tanks being connected to the secondary winding of the first asynchronous machine and the other set to the secondary winding of the second asynchronous machine, substantially as described.

3. The combination with a supply circuit and two asynchronous machines, of a regulating rheostat of the kind described, and means for automatically varying the resistance connected to either of the secondary windings of the two asynchronous machines, said means comprising two induction motors with opposing torques, the rotors of which are connected to the shaft of the rheostat, one of the primary windings having a series connection with the supply circuit and the other primary winding having a shunt connection therewith.

4. The combination with two asynchronous dynamo-electric machines, one of which has its primary member electrically connected to a work circuit between the generator and the load and its secondary member provided with a fly-wheel and mechanically and electrically connected to the primary member of the other, of a set of resistance members and means for connecting them in circuit with the secondary winding of either machine.

5. The combination with a polyphase alternating current circuit and two asynchronous dynamo-electric machines, the primary member of one of which is adapted for connection to said circuit between the generator and the load and the secondary of which is mechanically and electrically connected to the primary member of the other machine and is provided with a fly-wheel, of a set of variable resistance members, an adjustable device for connecting more or less of the resistance in circuit with the secondary winding of either asynchronous machine and two opposing motors for said adjustable device one of which is connected in series and the other in shunt relation to the main circuit.

6. The combination with a main circuit, two asynchronous dynamo-electric machines connected electrically in cascade and also mechanically and provided with a fly-wheel and means for connecting the primary winding of one of the machines to the main circuit, of resistance members and means for connecting more or less of the resistance in circuit with the secondary winding of the one or the other of the asynchronous machines as the load on the main circuit varies.

7. The combination with a main circuit, of a load equalizer comprising two cascade-connected asynchronous machines and means for connecting more or less resistance in circuit with the secondary winding of the one or the other machine as the load on the main circuit varies.

8. The combination with a power circuit, of a load equalizer comprising two cascade-connected asynchronous machines provided with a fly-wheel and means for automatically connecting more or less resistance in circuit with the secondary of the one or the other machine as the load on the power circuit varies.

In testimony whereof, I have hereunto subscribed my name this fourth day of May, 1906.

RUDOLF BRAUN.

Witnesses:
I. SVARTZ,
M. S. KENYON.